US006310995B1

(12) United States Patent
Saini et al.

(10) Patent No.: US 6,310,995 B1
(45) Date of Patent: Oct. 30, 2001

(54) RESONANTLY COUPLED WAVEGUIDES USING A TAPER

(75) Inventors: Simarjeet S. Saini, Olney, MD (US); Vijayanand Vusirikala, Neshanic Station, NJ (US); Peter J. Heim, Washington, DC (US); Robert Ernest Bartolo, Greenbelt; Mario Dagenais, Chevy Chase, both of MD (US)

(73) Assignee: University of Maryland, College Park, MD (US)

( * ) Notice: Subject to any disclaimer, the term of this patent is extended or adjusted under 35 U.S.C. 154(b) by 0 days.

(21) Appl. No.: 09/447,428

(22) Filed: Nov. 23, 1999

Related U.S. Application Data

(60) Provisional application No. 60/110,015, filed on Nov. 25, 1998, and provisional application No. 60/116,076, filed on Jan. 15, 1999.

(51) Int. Cl.[7] ............................................... G02B 6/26
(52) U.S. Cl. ................................. 385/28; 385/39; 385/43
(58) Field of Search ................................. 385/28, 39, 43, 385/27

(56) References Cited

U.S. PATENT DOCUMENTS

| | | | |
|---|---|---|---|
| 4,852,113 | * | 7/1989 | Botez ..................................... 372/50 |
| 5,278,926 | * | 1/1994 | Doussiere ............................. 385/28 |
| 5,574,807 | * | 11/1996 | Snitzer ................................. 385/24 |
| 5,574,808 | * | 11/1996 | Van Der Tol .......................... 385/28 |
| 5,799,119 | * | 8/1998 | Rolland et al. ........................ 385/28 |

OTHER PUBLICATIONS

Morl et al., "Uncladded InGaAsP/InP rib waveguides with integrated thickness tapers for efficient fiber–chip butt coupling", Electronics Letters, vol. 32, No. 1, pp. 36–38, Jan. 1996.*

Albrecht et al., "Polarization independent integrated mode transformer for uncladded InGaAsP/InP rib waveguides without epitaxial regrowth", 22nd European Conference on Optical Communication (ECOC'96, Oslo), pp 2.119–2.122, Jan. 1996.*

"Fabrication of nonlinearly shaped optical waveguide tapers on InP with precise design–parameter control", H.J. Bruckner, H.J. Olzhausen, and R. Zengerlo.

"Monolithically integrated DBR lasers with simple tapered waveguide for low–loss fibre coupling", K, Kasaya, Y. Kondo, M. Okamoto, O. Mitomi and N. Naganuma.

"Theoretical and Experimental Studies of a Spot–Size Transformer with Integrated Waveguide for Polarization Insensitive Optical Amplifiers", Boumedienne Mersali, Hans Josef Bruckner, Monique Feuillade, Serge Sainson, Abdallah Ougazzaden, and Alain Carenco.

"Analysis of Lossy Dielectric Guides by Transverse Magnetic Field Finite Elements Method", Philip Cheung, Member, IEEE, M. Silveira, and A. Gopinath, Fellow, IEEE.

"Design of a Spotsize–Converter–Integrated Laser Diode (SS–LD) with a Lateral Taper, Thin–Film Core and Ridge in the 1.3 um–Wavelength Region Based on the d–D BPM", Kenji Kawano., Masaki Kohtoku, Masato Wada, Hiroshi Okamoto, Yoshio Itaya, member IEEE, and Mitsuru Naganuma, Member, IEEE.

(List continued on next page.)

*Primary Examiner*—Ellen E. Kim

(57) ABSTRACT

A resonant coupler has a coupling region having first and second ends, a coupling length, and a tapered variable width, such that a phase matching condition for the waveguide is met within the coupling length. In an exemplary embodiment the first and second ends each have a corresponding variable width which varies at a rate greater than the variable width of the coupling length. In yet another embodiment the coupling region has an electrically sensitive phase matching characteristic and an electrode in operative relation with the coupling region for varying the phase matching characteristic.

24 Claims, 16 Drawing Sheets

OTHER PUBLICATIONS

"Semiconductor Layer with Tapered–Rib Adiabatic–Following Fiber Coupler for Expanded Output–Mode Diameter", G.A. Vawter, Member, IEEE, R.E. Smith, H. Hou, Member, IEEE, and J.R. Wendt, Member, IEEE.

"InP–Based Multiple Quantum Well Lasers with an Integrated Tapered Beam Expander Waveguide", R. Ben-–Michael, U. Koren, B.I. Miller, Member IEEE, M.G. Young, M. Chien, and G. Raybon.

"Laterally Tapered InP–InGaAsP Waveguides for Low–Loss Chip–to–Fiber Butt Coupling: A Comparison of Different Configurations", R. Zengerle, O. Leminger, W. Weiershausen, K. Faltin, and B. Hubner.

"GaAs–AlGaAs QW Diluted Waveguide Laser with Low-–Loss, Alignment–Tolerant Coupling to a Single–Mode Fiber", V. Vusirikala, B.P. Gopalan, S. Kareenahalli, S.A. Merritt, Member, IEEE, M. Dagenais, Senior Member, IEEE, C.E.C. Wood, and D. Stone.

"Improved Laser–Fiber Coupling by Usning Spot–Size Transformer", B.M.A. Rahman, Senior Member, IEEE, M. Rajarajan, T. Wongcharoen, Member, IEEE, and K.T. V. Grattan, Member, IEEE.

"Spot–Size Converted 1.3um Laser with Butt–Jointed Selectively Grown Vertically Tapered Waveguide", Y. Tohmori, Y. Suzaki, H. Fukano, M. Okamoto, Y. Sakai, O. Mitomi, S. Matsumoto, M. Yamamoto, M. Fukuda, M. Wada, Y. Itaya, and T. Sugie.

"InGaAsP/InP Tapered Active Layer Multiquantum Well Laser with 1.8dB Coupling Loss to Cleaved Singlemode Fibre", I.F. Lealman, L.J. Rivers, M.J. Harlow and S.D. Perrin.

"Low–Loss Coupling of 980nm GaAs Laser to Cleaved Singlemode Fibre", J. M. Verdiell, M. Aziari and D.F. Welch.

"1.3um InGaP/InAsP MQW Lasers with Large Spot–Size and Low Loss Fibre Chip Coupling Fabricated by a Standard Buried Heterostructure Process", N. Bouadma, A. Ougazzaden, M. Kamoun, C. Kazmierski and L. Silverstre.

"Alignment–Relaxed 1.55um Multiquantum Well Lasers Fabricated Using Standard Buried Heterostructure Laser processes", M.H. Shih, F.S. Choa, R.M. Kapre, W.T. Tsang, R.A. Logan and S.N.G. Chu.

"1.3um Beam–Expander Integrated Laser Grown by Single Step MOVPE", H. Sato, M.Aoki, M. Takahashi, M. Komori, K. Uomi and S. Tsuji.

* cited by examiner

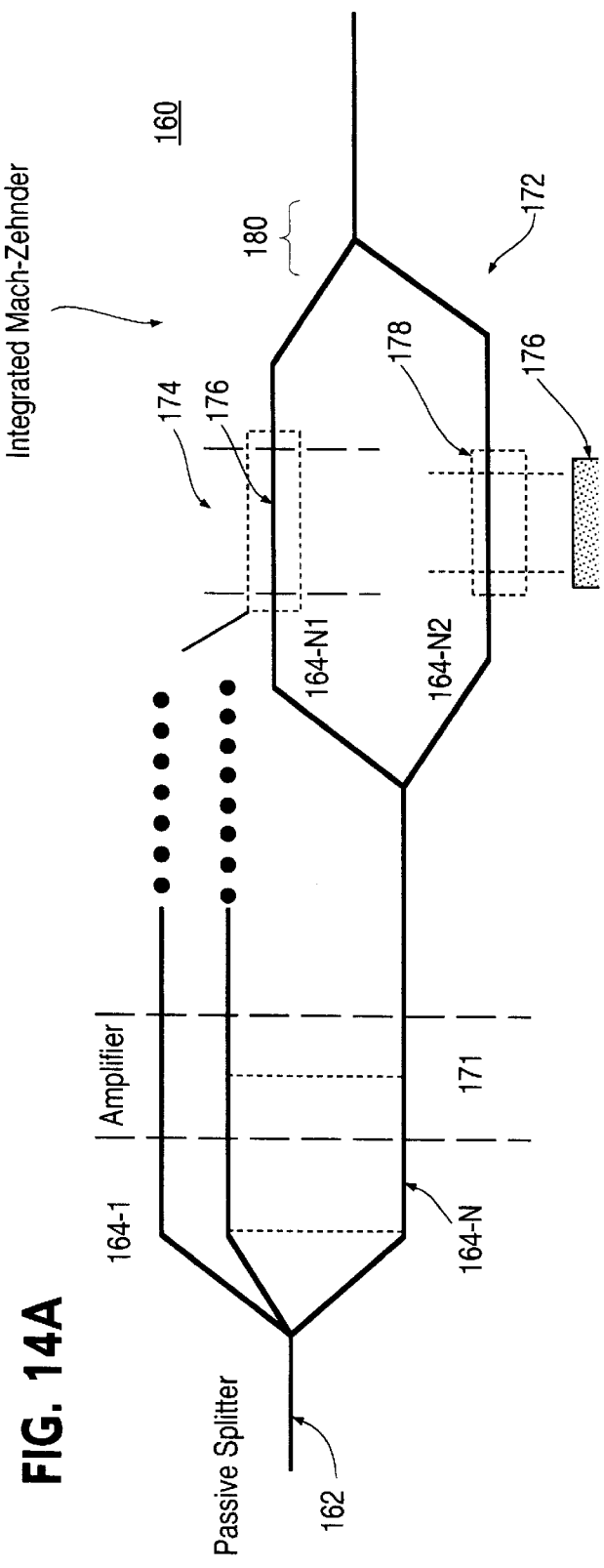
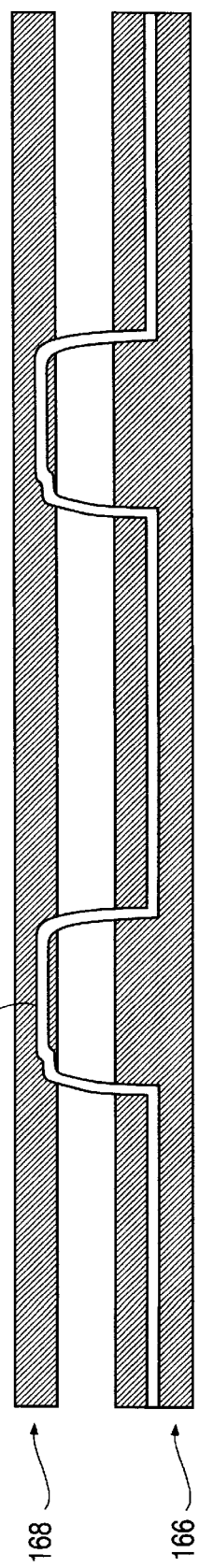
FIG. 14A
FIG. 14B

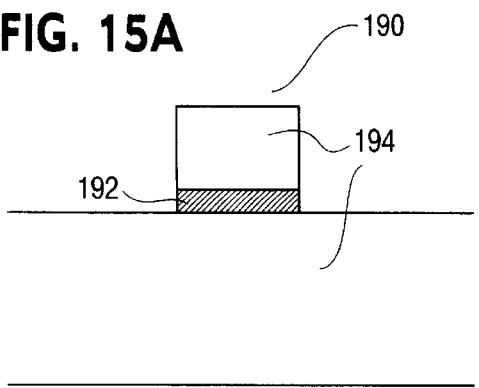
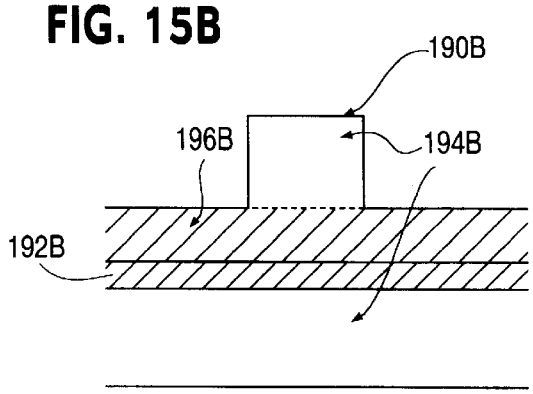
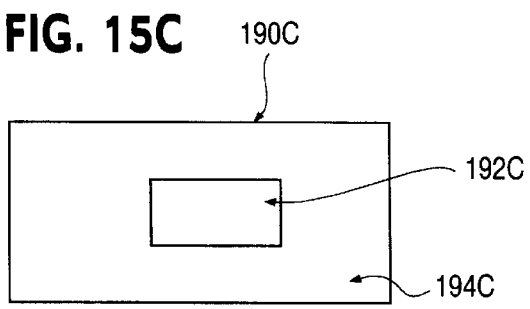
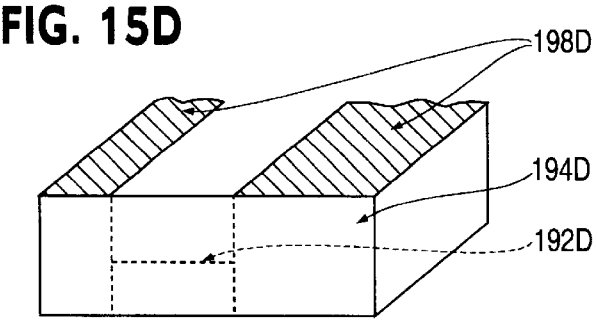
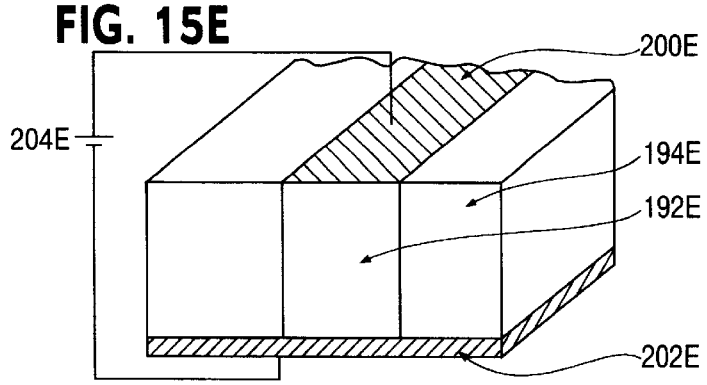

wavelength polarization sensitivity

RESONANTLY COUPLED WAVEGUIDES USING A TAPER

RELATED APPLICATIONS

This application claims the benefit of U.S. Provisional Application No. 60/110,015 filed Nov. 25, 1998, and U.S. Provisional Application No. 60/116,076 filed Jan. 15, 1999, the disclosures of which are hereby incorporated by reference in their entirety.

This invention was made with Government support under Contract Number MDA 90495C2037 awarded by the National Security Agency. The Government has certain rights in the invention.

This invention was made with government support pursuant to contract No. MDA90495C2037 awarded by the National Security Agency. The National Security Agency has certain rights in this invention.

BACKGROUND OF THE INVENTION

The invention pertains to optical coupling, and in particular, to optical resonant coupling between two waveguides.

There is a need for monolithically integrating various active and passive optical devices to obtain highly functional optical modules. The platform technology to this monolithic integration should be as simple as possible to keep costs low. Currently, the technologies used for monolithic integration, like selective area growth, or regrowth, are not only very expensive but also do not allow for enough freedom in designing the various active and passive devices.

The modes of a laser and an optical fiber are poorly matched in size and shape, leading to poor coupling efficiency therebetween. By integrating a mode expander with a laser, it is possible to obtain efficient coupling to an optical fiber. The invention describes a general technique by which a mode can be coupled from a tightly confined waveguide to a loosely confined waveguide. In particular, the invention employs resonant coupling to achieve mode expansion over a relatively short distance to efficiently couple a tightly confined waveguide in an active region of a semiconductor laser/amplifier and a loosely confined mode in a passive waveguide such as an optical fiber.

Various mode expanders have been demonstrated based on a concept called adiabatic mode transformation. In this approach, there are two separate sections in the device: a section optimized for high gain; and a section optimized for maximum coupling to a fiber. The sections are linked through a mode expander region, which adiabatically transforms, i.e. expands, the mode from the first section to the second section. For minimum losses to occur, adiabatic mode transformation must take place gradually over a relatively long length, e.g. 500 microns. In an exemplary device, as shown in FIGS. 1A and 1B, the adiabatic mode expander is formed as an extension to the active device such as a laser.

Mode transformation can be achieved by means of a technique known as resonant coupling, sometimes hereinafter referred to as phase matching. When two waveguides are approximately matched in their refractive indices and dimensions, and are located in close proximity, there is a transfer of power between the two waveguides in an oscillatory fashion. In other words, the mode in one waveguide is coupled to the proximate waveguide. This phenomenon is illustrated in FIGS. 1C and 1D wherein two waveguides I & II, each 1 μm wide and each with a refractive index of 3.21 are proximately located in side by side relationship. Waveguide I may be an active device having an electrical current input, and waveguide II may be a passive device. The power transfer between the two waveguides is theoretically 100%. If the refractive index of waveguide I is changed, for example, to 3.23 keeping the width unchanged, weak coupling results as the waveguides are no longer phase matched. However, if the width of the waveguide I is changed, for example, to 2 μm, strong coupling is once again observed. This implies that the phase matching condition is re-established. Thus, the phase matching condition depends both on the refractive index and the dimensions of the waveguide. The device, shown in FIGS. 1C and 1D, comprises two rectangular waveguides: active waveguide I and coupling waveguide II. Waveguide I has a higher refractive index than waveguide II, but has a smaller size in both the horizontal (lateral) and vertical (transverse) directions. On the other hand, the waveguide II has a lower refractive index than waveguide I, but has a larger size in both dimensions. The two waveguides can be designed so that their effective refractive indices are nearly equal. This close match of the effective refractive indices forces the power to couple back and forth between the two waveguides in an oscillatory fashion over a characteristic overlapping distance along the length of the waveguides, known as the coupling length $L_c$.

In principle, by cleaving the device within the coupling length $L_c$ at the exact point where the mode resides in the lower coupling waveguide II, i.e., where transfer takes place, a mode expander can be realized. However, the refractive indices of materials are not known with great precision. Further, the refractive indices also depend on the current injection level in the active device I. Given this uncertainty in the refractive indices, it is not possible to design the waveguides for optimum power transfer. In addition, the point where the mode in waveguide I couples to waveguide II is not known a priori. Therefore, the practical feasibility of the method has not been demonstrated so far. In addition, there is an oscillatory power transfer along the device between the two waveguides due to the phase-matched condition being met along the entire length of the device. Because, there is a power loss during each oscillatory cycle, the device length is usually limited to $L_c$. This limits the length of the gain (active) region of waveguide I, which in turn, affects the performance of the device.

SUMMARY OF THE INVENTION

The invention pertains to an approach for resonant coupling from a waveguide to another waveguide positioned in the horizontal or vertical plane, using an horizontal or a vertical taper, or a combination of both. The optical coupling between the two waveguides occurs over a very short taper with low optical loss. The invention enables monolithic integration of various passive and active optical devices and allows for improved coupling efficiency and alignment tolerances between various waveguides such as a laser and an optical fiber.

Multiple waveguides can be placed in close proximity to each other. Each waveguide can be optimized, for a specific optical function (e.g. active waveguide optimized for gain, passive waveguide optimized for ease of coupling, passive waveguide optimized for splitting, directional coupling or other passive devices). Using a properly designed taper, the optical mode can be moved from one waveguide to another as many times as required, therefore, achieving monolithic integration of several optical devices performing different functions.

The above-mentioned limitations of existing approaches are overcome in the device according to the invention by using a mode transformer having a selected tapered geometry for the active waveguide I. The horizontal dimension of waveguide I is tapered from a initial large width ($W_i$) to a small final width ($W_f$). To have arbitrarily long gain sections integrated into the device, it is necessary to have a portion where the two waveguides are off resonance, ensuring that the mode is resident almost entirely in waveguide I. This condition is achieved by choosing a suitably large initial width $W_i$. The tapering of waveguide I between two extreme widths ensures that the mode matching condition is met somewhere along the taper. When this condition is met, the dimensions of the waveguide I change slowly so that the optical power is transferred resonantly to waveguide II. It does not matter where exactly it occurs as long as it is in the range expected. In addition, the taper is such that waveguide I achieves a cutoff condition over a length smaller than the coupling length $L_c$, thus forcing the mode to be resident in waveguide II without oscillation. This makes the point of cleaving non-critical. In addition, the characteristic lengths can be designed to be much smaller than the lengths needed for adiabatic mode transformers. These short characteristic lengths directly translate to shorter lengths for the overall mode expanders.

In an exemplary embodiment, the mode transformer for coupling modes between first and second waveguides includes a coupling region having first and second ends, a coupling length, and a variable tapered width, such that, a phase matching condition is met within the coupling length defined in said coupling region. A tapered inlet for each end of the coupling region transmits a mode between each waveguide and the corresponding end of the coupling region. The inlets each have a first variable width which varies at a rate greater than the variable width of the coupling region.

In another embodiment, the coupling region includes an electrode means for varying a cut off characteristic of the coupling region.

BRIEF DESCRIPTION OF THE DRAWINGS

FIGS. 14A and 14B are schematic plan and sectional views respectively of an active-passive monolithic optical piece with multiple channels;

FIGS. 15A–15E are schematic illustrations of various waveguides which may be employed in any desired combination in accordance with the invention;

DESCRIPTION OF THE INVENTION

The following is a presentation of results from a set of computer simulations to demonstrate the use of resonant coupling between two waveguides for realizing a mode-expanded device according to the invention.

Figures 1A, 1B:
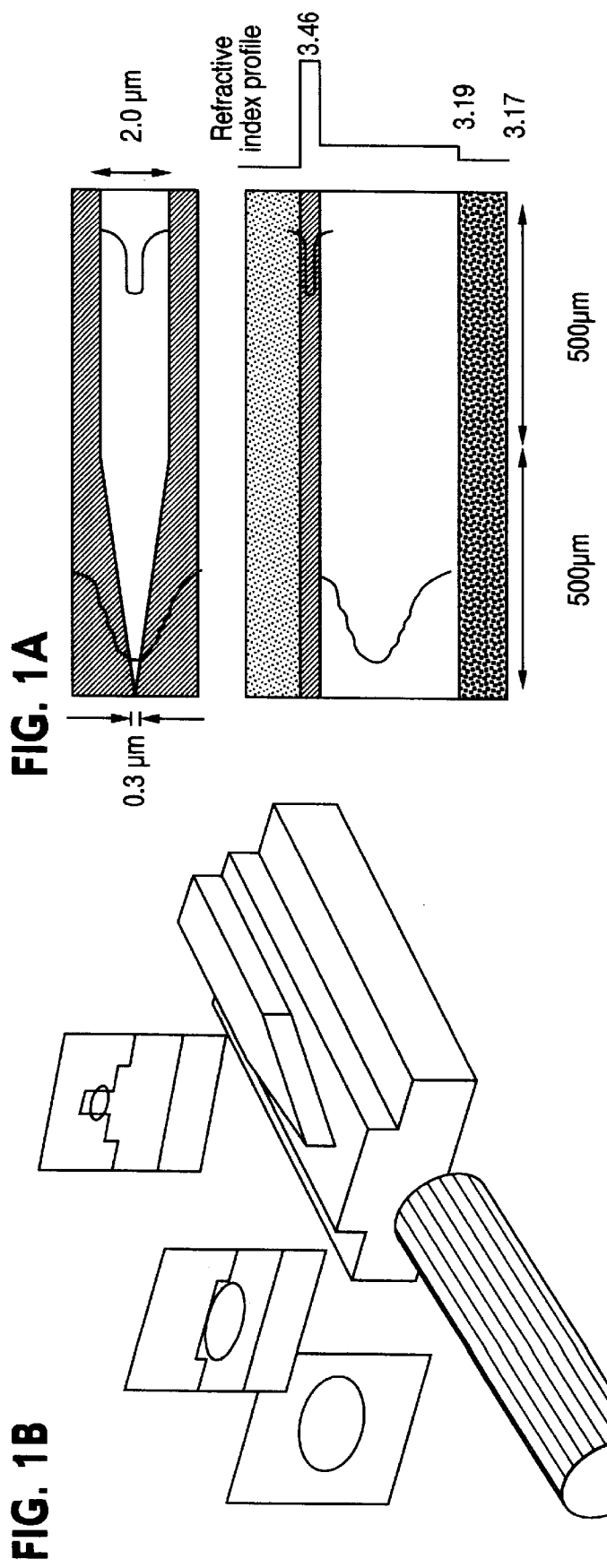
FIGS. 1A & 1B are schematic illustrations of an adiabatic mode transformer.
Figure 1C:
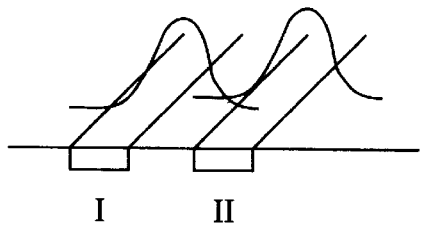
FIGS. 1C & 1D are generalized schematic illustrations of two waveguides exhibiting resonant coupling.
Figure 1D:
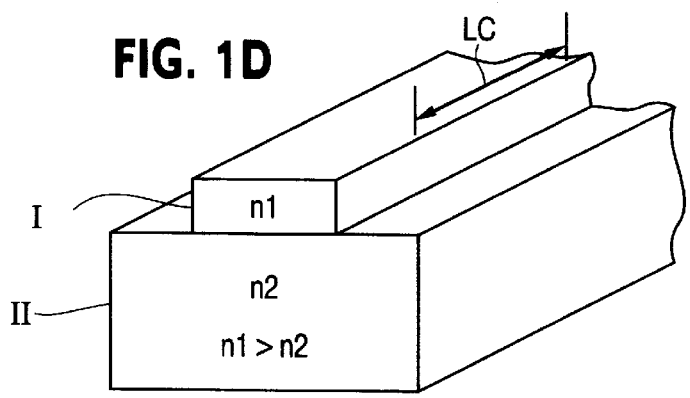
Figure 2:
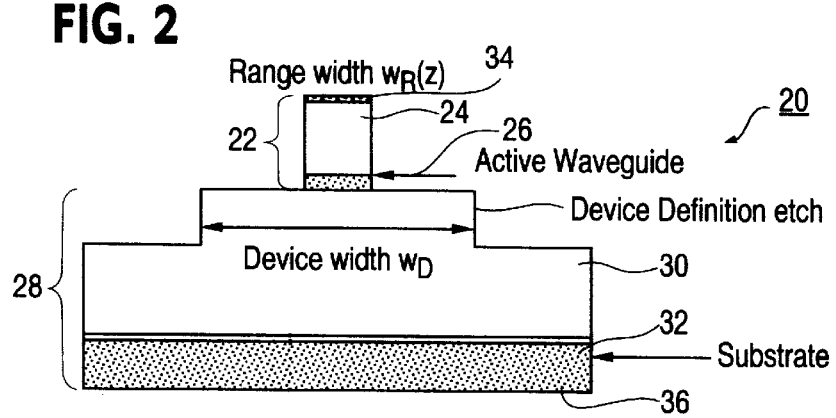
FIG. 2 is a sectional view of resonantly coupled waveguides according to the invention.

A schematic diagram of a basic device 20 used in the simulations is shown in FIG. 2. Table I sets forth the layer structure of the device 20 including active device 22 having an upper ridge width $W_R$ 24 and an active region 26, and a passive device 28 formed of a waveguide 30 on a substrate 32. Electrodes 34 and 36 disposed on the top and bottom respectively, provide the current terminals.

| Layer Name | Thickness | Refractive index |
| --- | --- | --- |
| 1. Inp Upper Cladding | 1.5 µm | 3.169 |
| 2. Active region | 0.11 µm | 3.460 |
| 3 Coupling Waveguide | 3.0 µm | 3.210 |
| 4. Inp Substrate |  | 3.169 |

The active region 26 is a 5-Quantum well/4 barrier stack with 400 A° SCH regions (QW thickness=100 A°, Barrier thickness=100 A°), designed for optimum gain at 1.55 µm, the low-loss window of standard telecommunication optical fibers. The refractive index of the 5 QW/4 barrier active layer stack 26 has an approximated equivalent index, which takes a weighted square average of the refractive index. For the simulations described herein, an equivalent index of 3.460 (a weighted average of 3.54 for the QW and 3.38 for the barrier) and an equivalent thickness of 0.11 µm (which represents the total thickness of the stack 26) were used. The arrangement of the active region 26 is discussed hereinafter.

The simulations were carried out using a commercial 3-D Beam Propagation Method (3-D BPM)software from Opti-wave Corporation. This software is capable of propagating a given input field along any arbitrarily defined waveguide. To obtain the initial mode supported at the start of the propagation, a 2-D eigen solver provided by the software package was used. The mode obtained from this solver was propagated across the waveguides using the 3-D beam propagation software. The following set of simulations demonstrates resonant coupling.

Figure 3:
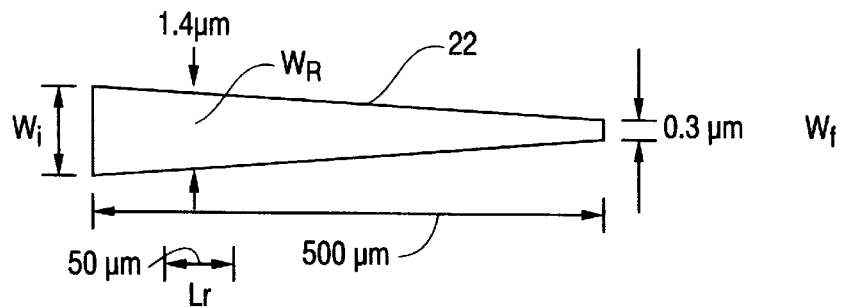
FIG. 3 is a plain view of a taper shape for the resonantly coupled waveguides shown in FIG. 2.

For the above specified layer structure and a device width ($W_D$), shown in the plan view of FIG. 3, we first determine the ridge width $W_R$ at which the phase matching condition is met. At this point the mode couples from the upper active region 26 to the lower coupling waveguide 30 over a characteristic coupling length $L_c$ along the device 20 as shown. To determine this point, an input mode was propagated along the device 20. The exemplary ridge width $W_R$ of the active device 22 is linearly tapered as shown from an initial width $W_i$ of 2.0 μm to a final width $W_f$ of 0.3 μm over a length of 500 μm.

Figure 4:
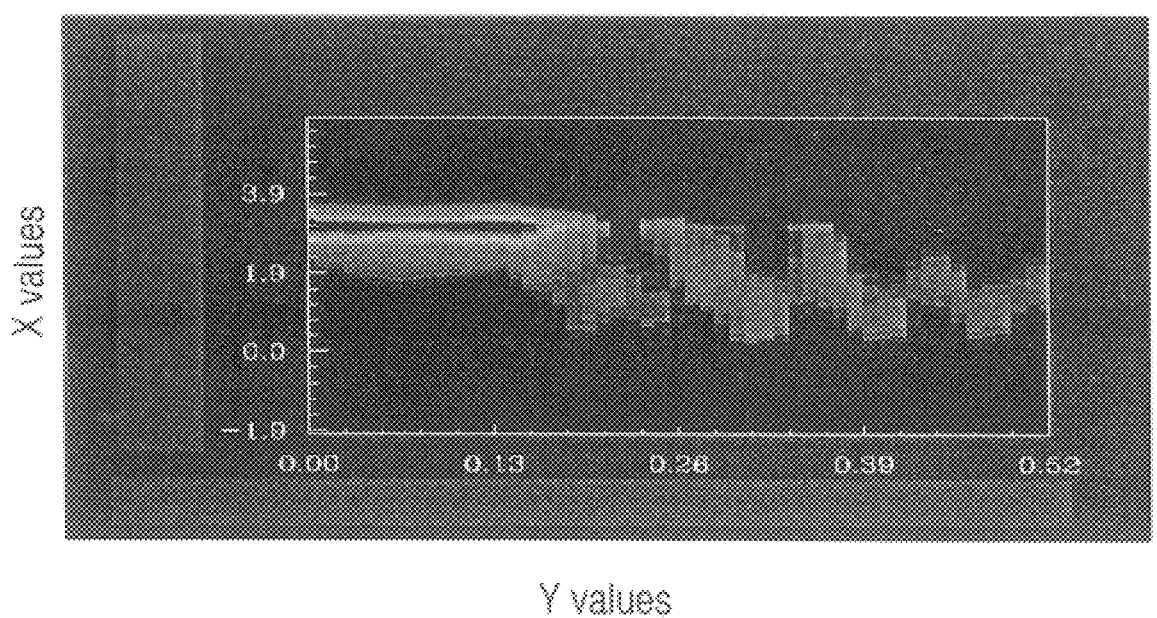
FIG. 4 is a graphical representation of light intensity as a function of distance along the waveguide in FIG. 2.

The light intensity distribution in the transverse direction as a function of the propagation distance is shown in FIG. 4. In the exemplary embodiment, the observed resonant coupling between the active region and the coupling waveguide takes place where $W_R$=1.4 μm. The characteristic length $L_c$ is about 50 μm. Two oscillations are observed in which the power is coupled from one waveguide to the other. This leads to undesirable power losses which are obviated according to an embodiment of the invention discussed below.

Figure 5:
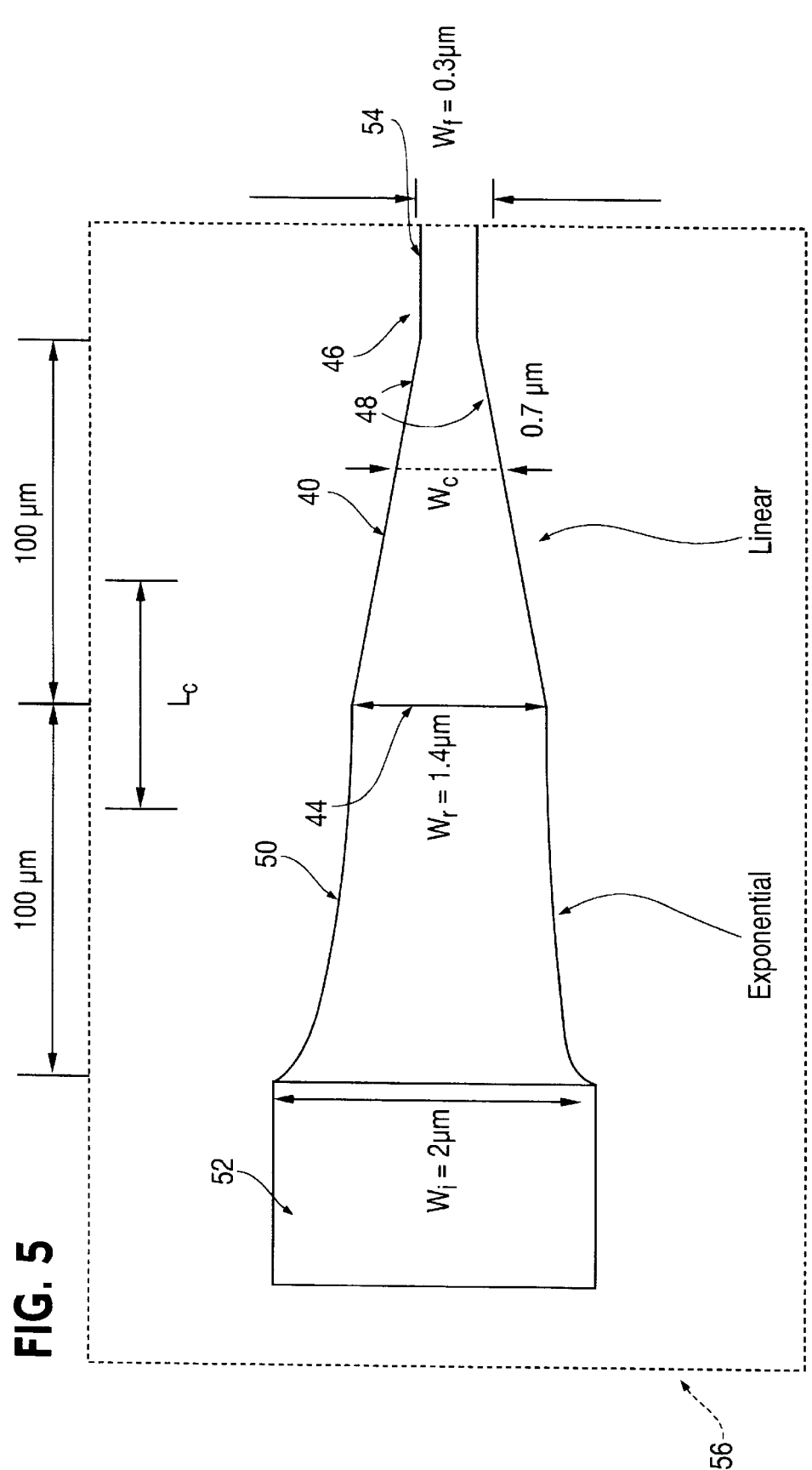
FIG. 5 is a plain view of an exemplary taper shape.

FIG. 5 illustrates such an embodiment of the invention, wherein a waveguide 40 having a variable taper shape prevents oscillations and confines the mode to the lower waveguide after resonant coupling takes place. The device 40 shown in FIG. 5 has a moderately tapered coupling region 42 formed with respective opposite ends 44 and 46 and tapered walls 48 that converge slowly over the coupling length 42 ($L_c$). The larger end 44 has a more severe taper 50 to couple the active region 52 to the coupling region 42. The small end 46 is terminated by a cut-off region 54 as shown. In the arrangement shown, the walls 48 are tapered from about 1.4 μm at the large end 44 to a ridge width $W_c$ where the active waveguide cannot support any mode (cut-of condition), over a length smaller than the characteristic length $L_c$. This ensures that the mode does not couple back to the active waveguide. Electrode 56 shown in dotted line covers the active region 52 and the coupling region 42 and 54, and severe taper region 58.

For the device design shown, the cut-off condition for the active waveguide is achieved at a ridge width of $W_C$=0.7 μm. Accordingly, the ridge width is tapered from about $W_R$=1.4 μm to about 0.3 μm over a length of about 100 μm, as shown. The taper 50 varies from about 2 μm to about $W_R$=1.4 μm over a length of about 100 μm. The overall length of about 200 μm is considerably less than the length of the adiabatic device shown in FIG. 3 and can be further reduced with minimal optical losses.

Figure 6:
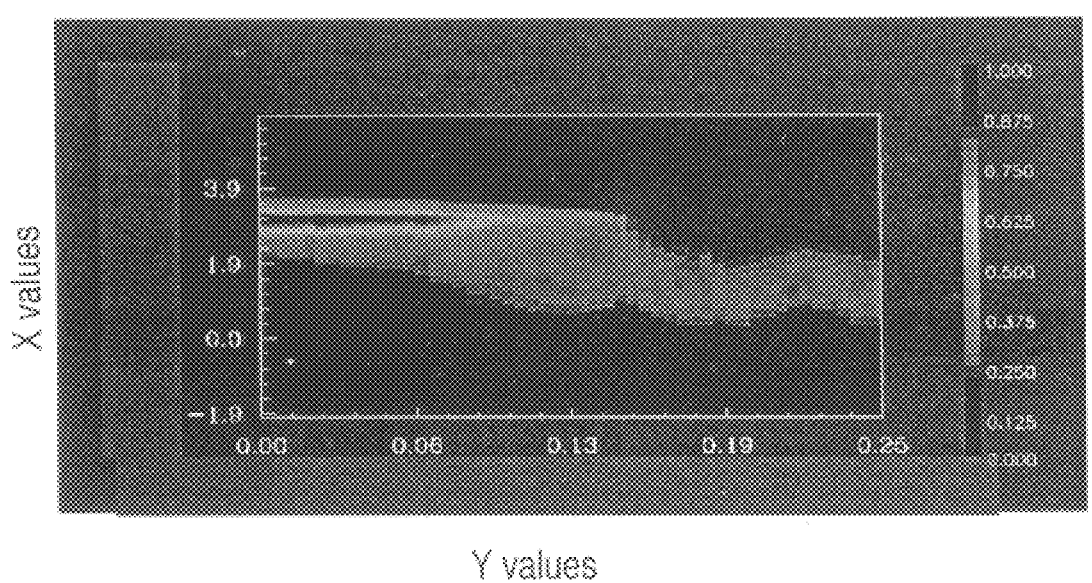
FIG. 6 is a graphical representation of the light intensity as a function of distance in a waveguide formed with the taper of FIG. 5.

The simulation results are shown in FIG. 6 where it can be observed that the mode is resonantly coupled to the underlying waveguide at a taper width of 1.4 μm. However, as the active waveguide width is decreased, below the cut-off width before the mode gets resonantly coupled back to the active region, i.e. the mode resides only in the coupling waveguide. Thus, by using the technique according to the invention, efficient mode transformation over very short lengths can be achieved.

Figure 7A:
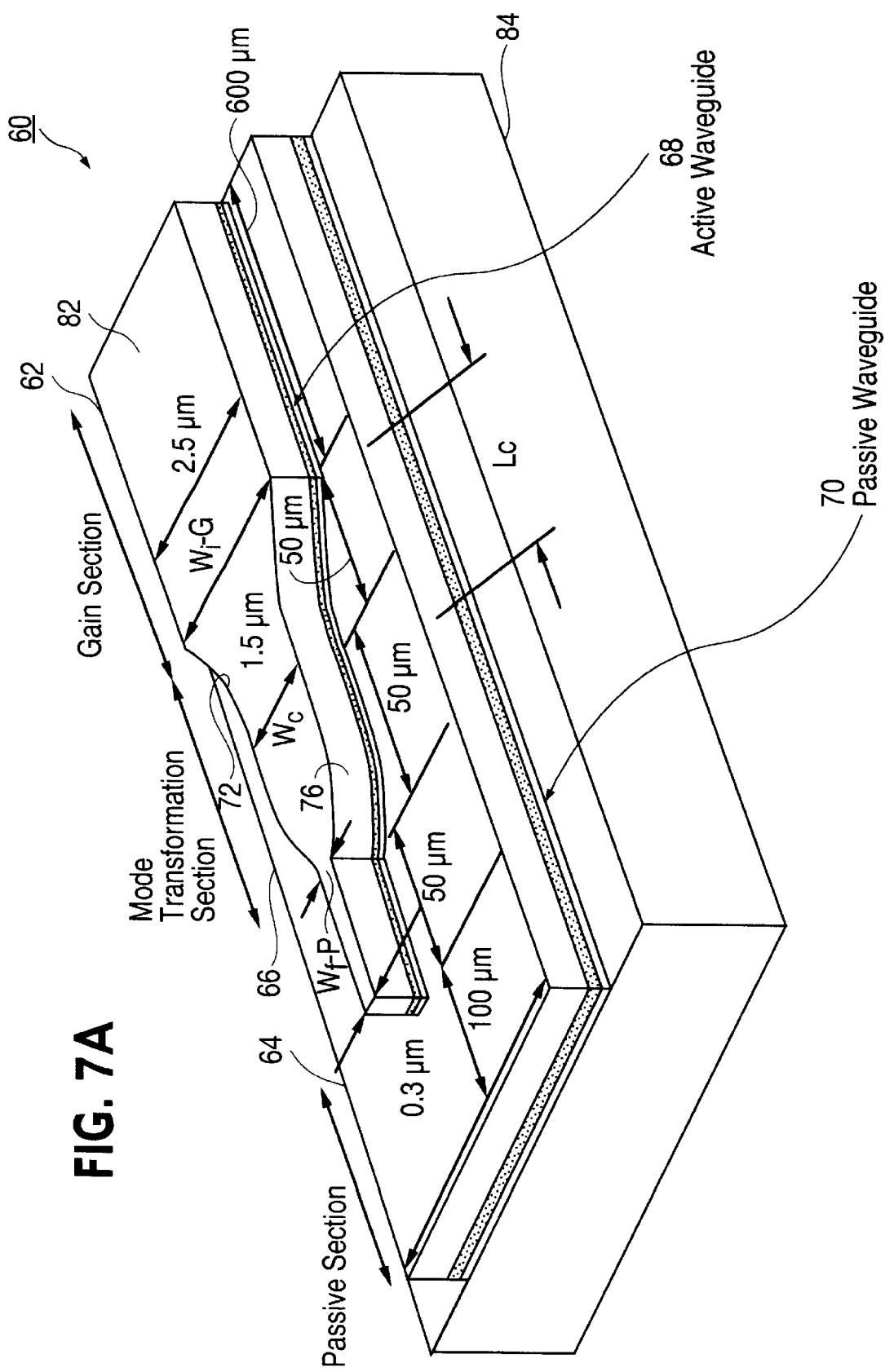
FIG. 7A is a perspective illustration showing a device with active and passive monolithic integration.

FIG. 7A is a perspective illustration of another exemplary embodiment of the invention featuring active-passive monolithic integration. In the arrangement, a resonant coupler 60 is shown coupling an active gain section 62, a passive section 64 and an intermediate mode transformer section 66. The coupler 60 resonantly couples modes bidirectionally between an active waveguide 68 and a passive waveguide 70. The gain section 62 has a uniform ridge width of about 2.5 μm as shown. Likewise, the top waveguide in the passive section 64 has a ridge width of about 0.3 μm to ensure cutof. The intermediate mode transformer section 66 has an overall length of about 100 μm which is long enough to keep loss low but short enough to ensure coupling without oscillations. Taper lengths as short as 40 μm can be designed for a slightly higher optical loss. The dimensions and taper shape shown in FIG. 7A are exemplary and depend on the type of materials and the functions implemented. In the exemplary embodiment, the active section 62 employs an active solid state laser waveguide with a confined mode. The passive section 64 employs a passive waveguide 70 with a confined mode. It should be understood, however, that the passive waveguide 70 may be less confined. Also, if desired, the arrangement shown may include a pair of resonantly coupled, confined active waveguides.

The shape of the tapered ridge 72 in mode transformer section 66 may be tailored for various waveguides having different characteristics. In the arrangement shown, the region 72 employs an exponential configuration including a first exponentially tapered section 74 at an interface 74 coupled to the gain section 62 and having an initial width $W_i$–G, and second exponentially tapered section 76 starting at interface 78 and ending at the passive section 64 and having a final width $W_f$–P, as shown. In the region where the first exponential section 72, and the second exponential section 76 meet, the ridge width tapers gradually in such a way that the optical mode gets resonantly transferred from one waveguide to the other over the length Lc which corresponds to the coupling length. The width of ridge 80 within the coupling length $L_c$ corresponds to the resonant ridge width $W_R$. All useful coupling occurs within the coupling length $L_c$. It should be understood that the device 60 shown in FIG. 7 employs an electrode 82 on the top surface, and an electrode 84 on the lower surface, as shown.

Figure 7B:
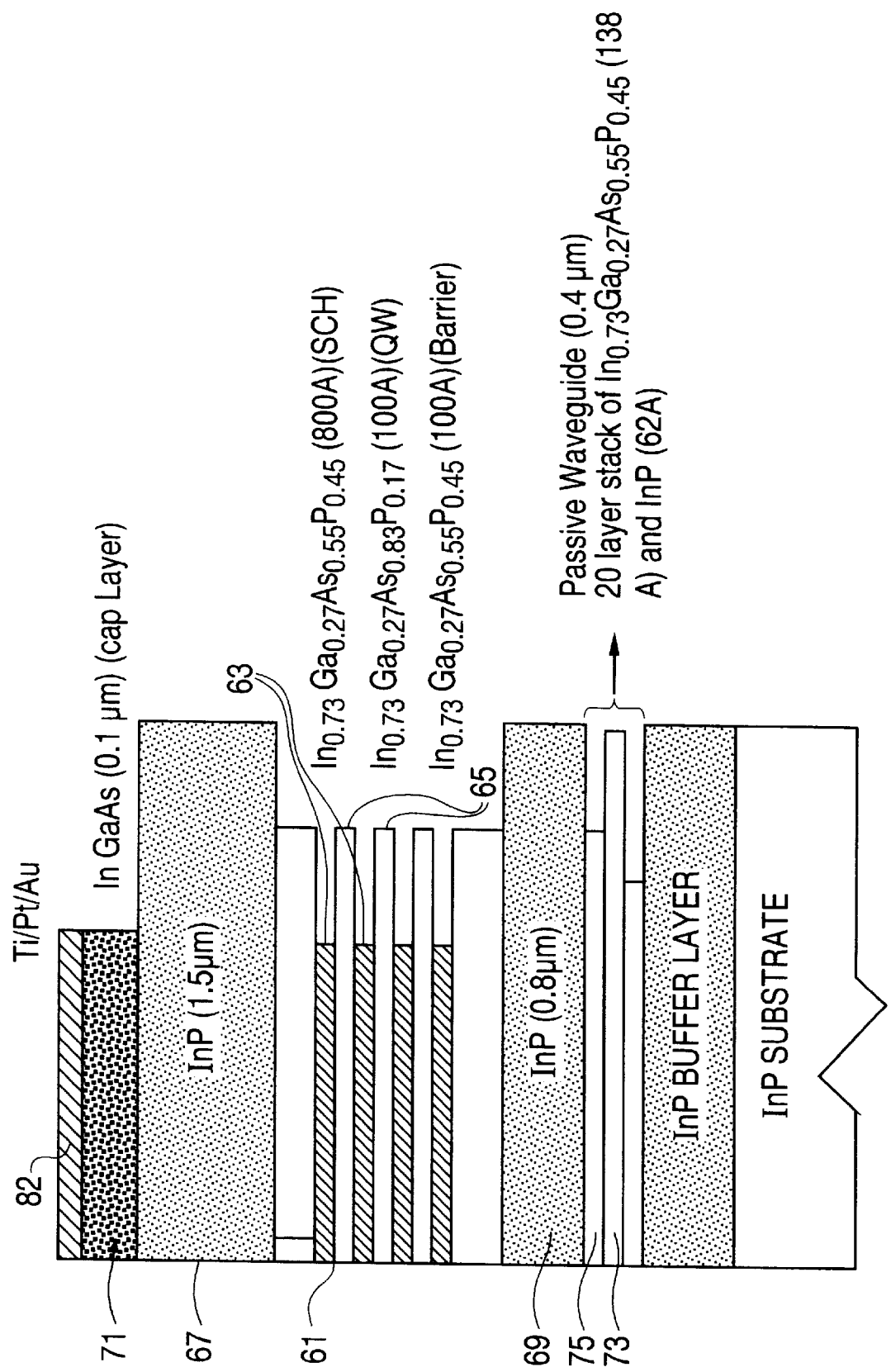
FIG. 7B is a cross-section of FIG. 7A taken along line 7B—7B thereof.

The layer structure of the device is shown in FIG. 7B. The active layer 61 is formed of undoped four 1% compressively strained 10 nm thick quantum wells 63 for emission at 1.55 μm, and three lattice matched 10 nm barriers ($\lambda_g$=1.25 μm) 65. The active layer is surrounded by a 1.5 μm InP upper cladding ($5\times10^{17}$ cm$^{-3}$ p-doped) 67 and a 0.8 μm Inp lower cladding 69 ($5\times10^{17}$ cm$^{-3}$ n-doped). A cap layer 71 is disposed over the upper cladding 67 to establish ohmic contact with electrode 82. The lower waveguide comprises a 20 layer stack of alternating InP (62A) 73 and lattice matched quaternary 75 (138A), with an equivalent refractive index of 3.32 and a total thickness of 0.4 μm.

In accordance with the invention, if the indices of refraction of the active and passive waveguides 68 and 70 are not close, the ridge taper in the coupling region 80 should gradually change between the initial to final width $W_i$-$W_f$ such that the coupling width $W_c$ is between $W_i$-$W_f$. Similarly, if the indices of refraction of the active and passive waveguides are similar, coupling width $W_c$ should likewise be between $W_i$-$W_f$. However, the taper may be less gradual because the coupling location is more readily determined.

Various alternative forms of the invention may be implemented as follows:

1. Different taper shapes:
   a) Two linear tapered regions, the first one being adiabatic to approach the coupling width and the second region being a rapid taper to prevent coupling back.
   b) Exponential+Linear Taper.
   c) Linear+Exponential Taper.
   d) Linear+Polynomial Taper or combinations thereof.
   e) Exponential–Exponential.
   f). Other functional dependence.

Figure 13:
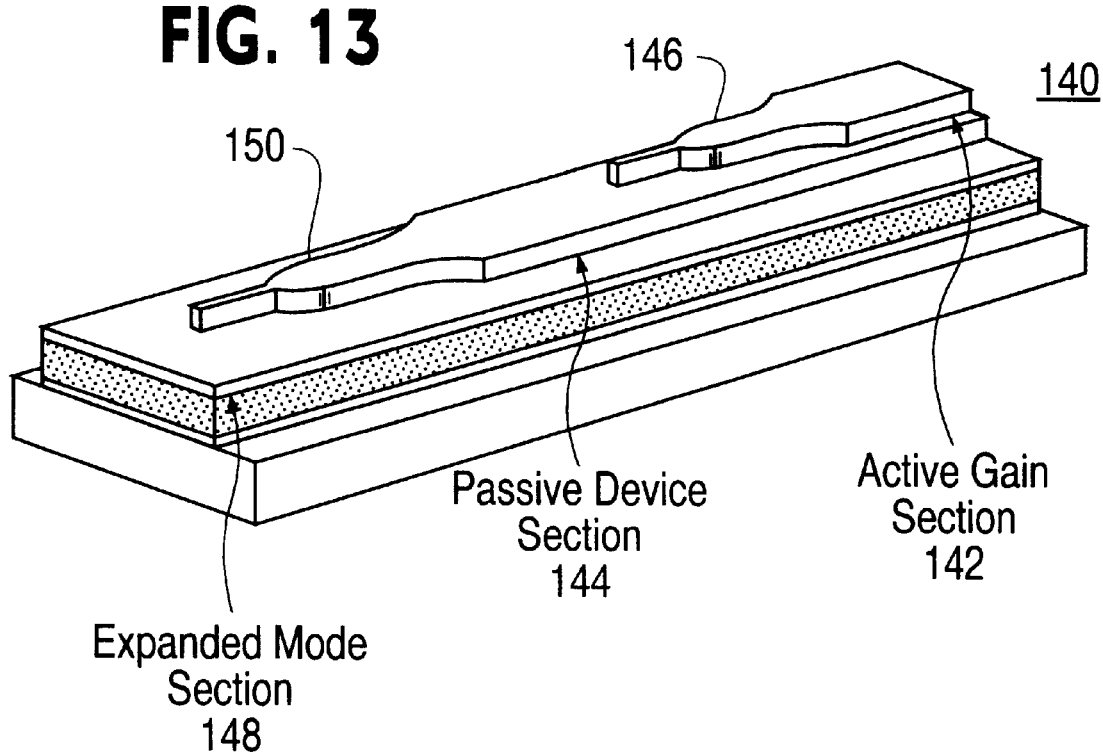
FIG. 13 is an illustration of a multiple waveguide stack showing active and passive integration with confined and expanded mode sections.

2. Different mode sizes in the two waveguides:
   a) For mode transformer applications couple from the tightly confined mode to the large mode.
   b) For other applications, e.g. involving integration of active and passive waveguides, the two waveguides can be of similar or dissimilar designs.
3. Different types of waveguides:
   a) One waveguide may be active (bulk or quantum wells), the other one may be passive.
   b) Both waveguides may be active.
   c) Both waveguides may be passive.
4. 3-D Integration:
   a) The method and arrangement employing two waveguides may be extended to multiple waveguides in the transverse direction, making it suitable for 3-D integration as shown in FIG. 13.
5. Waveguide Tapers:
   The waveguide can be of various types including ridge, buried, loaded, voltage induced or combinations thereof.
6. Functionality Integration:
   The resonant tapers can be used several times to couple light back and forth between different waveguides of different functionality. This leads to monolithic integration of several optical devices, e.g., loss-less splitters, Mach-Zehnder interferometers based on electro-absorption modulators or semiconductor optical amplifiers, cross-connect switches, distributed bragg grating lasers, modulators integrated with lasers, and the like.
7. Polarization:
   The optical devices can be polarization sensitive or insensitive.
8. Taper Direction:
   To achieve resonant coupling, the thickness of the waveguides, instead of its width, can be varied appropriately; or both the width and the thickness can be varied.
9. Multiple Tapers:
   Both the waveguides can have the tapers in the same section to achieve resonant coupling.
10. Materials:
    The optical waveguides resonantly coupled can be in either semiconductors, glass or polymers.
11. Waveguide Orientation:
    Tapered geometry may be used for coupling between two or more similar or dissimilar waveguides disposed side by side in the lateral direction instead of the transverse direction arrangements described above.

Figure 8:
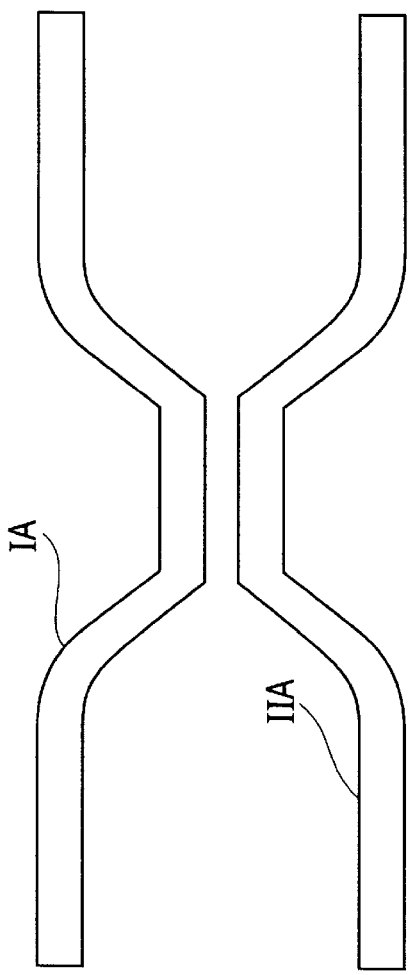
FIG. 8 is a plain view illustrating side-by-side coupling of phase matched waveguides.
Figure 9:
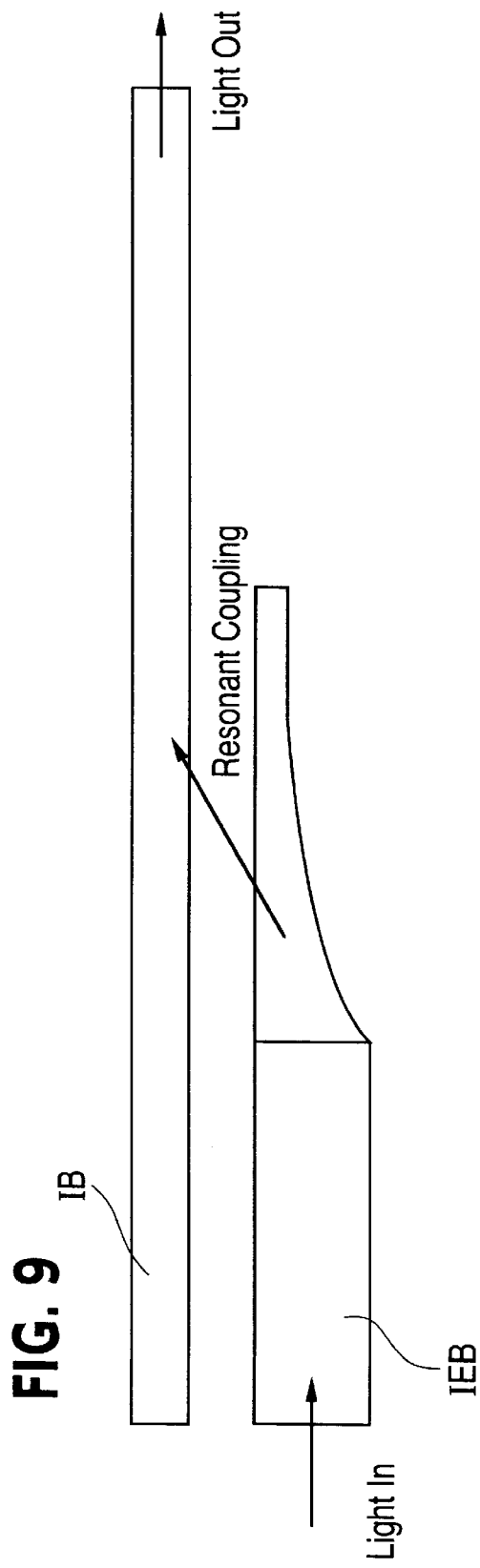
FIG. 9 is a plain view of side-by-side coupling of off resonant waveguides where one waveguide is tapered.

The conventional approach for coupling between two waveguides illustrated in FIG. 8, involves bringing the two phase matched waveguides IA–IIA into close proximity, for the resonant coupling to take place. For off-resonant waveguides, cumbersome grating assisted coupling schemes are required. In the approach using tapered ridge geometry according to the invention, it is possible to effect resonant coupling between two off-resonant waveguides IB–IIB as illustrated in the FIG. 9. The tapered geometry of waveguide IIB ensures that phase match occurs at some point along the tapered portion.

In the above arrangements, a mode-expanded laser uses resonant coupling between two waveguides. A tightly confined active waveguide is preferred for optimized gain performance of the device, and a loosely confined larger waveguide is preferred for efficient fiber coupling. The two waveguides of different dimensions are phase-matched by adjusting their refractive indices. If the two waveguides are in close proximity to effect evanescent field coupling, power from one waveguide can be resonantly coupled to the second waveguide as discussed. According to the invention, the active waveguide is tapered from a wide initial ridge width $W_i$ to a narrow final ridge width $W_f$. The coupling width $W_c$ is between the two values. The initial width $W_i$ is chosen such that the two waveguides are off resonance and the power resides mainly in the active waveguide. The final width $W_f$ is such that less than 1% of the power resides in the active region and the bulk of the power is in the larger waveguide. The taper is designed, such that the taper width varies very slowly so that optical power can propagate through the characteristic length $L_c$ required for resonant coupling at the coupling width $W_c$ where phase matching occurs. The taper is then reduced sharply so that the power does not couple back.

An exemplary device according to another embodiment of the invention uses an 100 μm exponential taper 88 long followed by a 100 μm linear taper. The region of the taper over which the mode is guided into the underlying waveguide is very small. Separate electrodes are employed in the active region and in the mode transformation region. An applied bias on the second electrode region changes the refractive index of the quantum wells appreciably by a phenomenon called electrorefraction. Having two electrodes on the active region, one in the active region and one in the mode transformation region, causes the laser to act like a switch. The first electrode is on the linear section of the device and is forward biased. This electrode provides the carriers required for the optical gain necessary for lasing or amplification. The second electrode is positioned on the section of the taper where the mode is coupled from the active waveguide to the underlying passive waveguide. By applying an appropriate negative bias on the second electrode, the refractive index of the active region may be increased so that the waveguides go off resonance and the coupling is destroyed or inhibited. The optical power instead of coupling into the underlying waveguide is radiated and the lasing may likewise be suppressed. In this device, electroabsorbtion also plays a role.

The device may be used as an inexpensive, directly driven laser source or as an external amplifier switch. As the switching is done using negative bias in the absence of injected carriers, the chirp (i.e. rise time) of the device should be low, permitting high-speed devices. Also, the taper which is used for mode expansion is also used for switching. Thus, there is no increase in the cavity length. As the device inherently has expanded mode, fiber coupling is simplified. Such an arrangement thus enables passive packaging of devices in a batch processing environment. Also these devices may use conventional fabrication techniques without regrowth. Thus, the devices are ideal for inexpensive optoelectronic circuits useful in various applications.

Figure 10A:
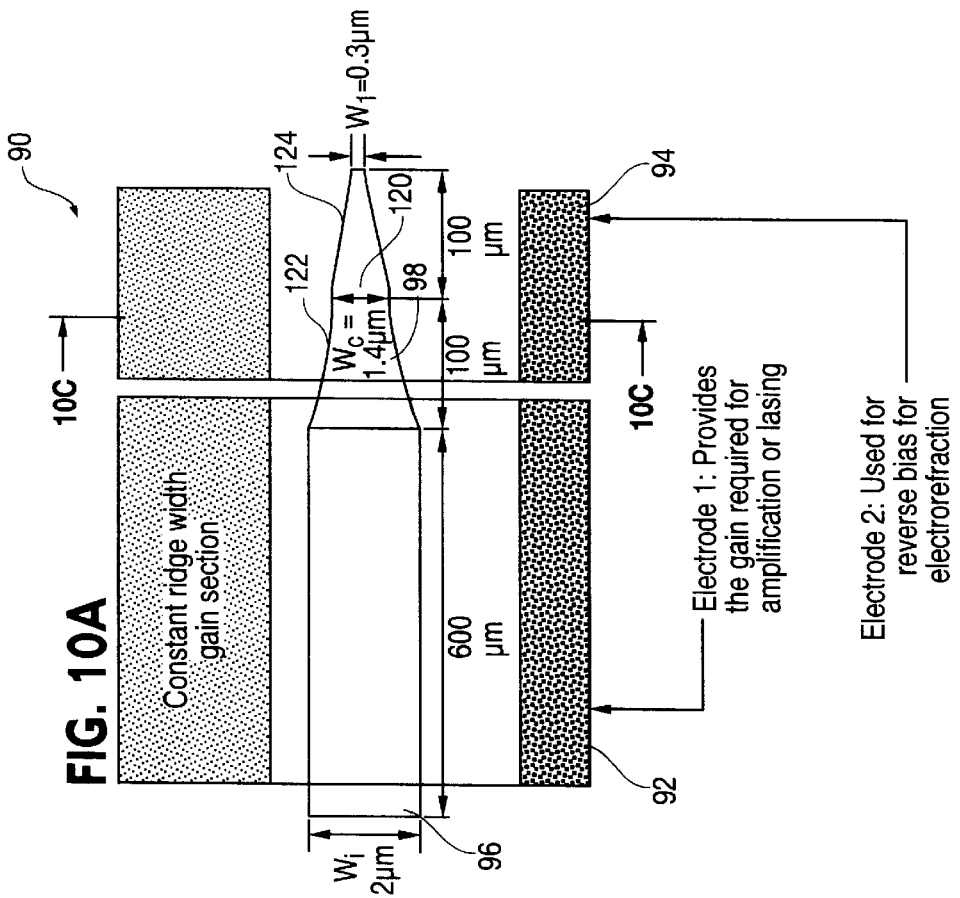
FIG. 10A is a plain view of a waveguide employing a separate cutoff electrode.
Figure 10B:
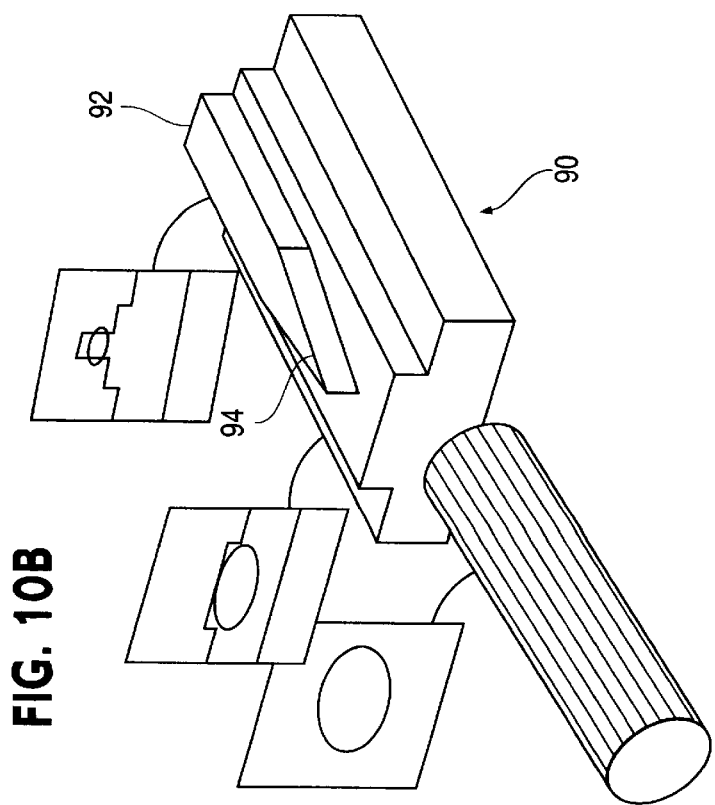
FIG. 10B is a perspective illustration of the arrangement shown in FIG. 10A.
Figure 10C:
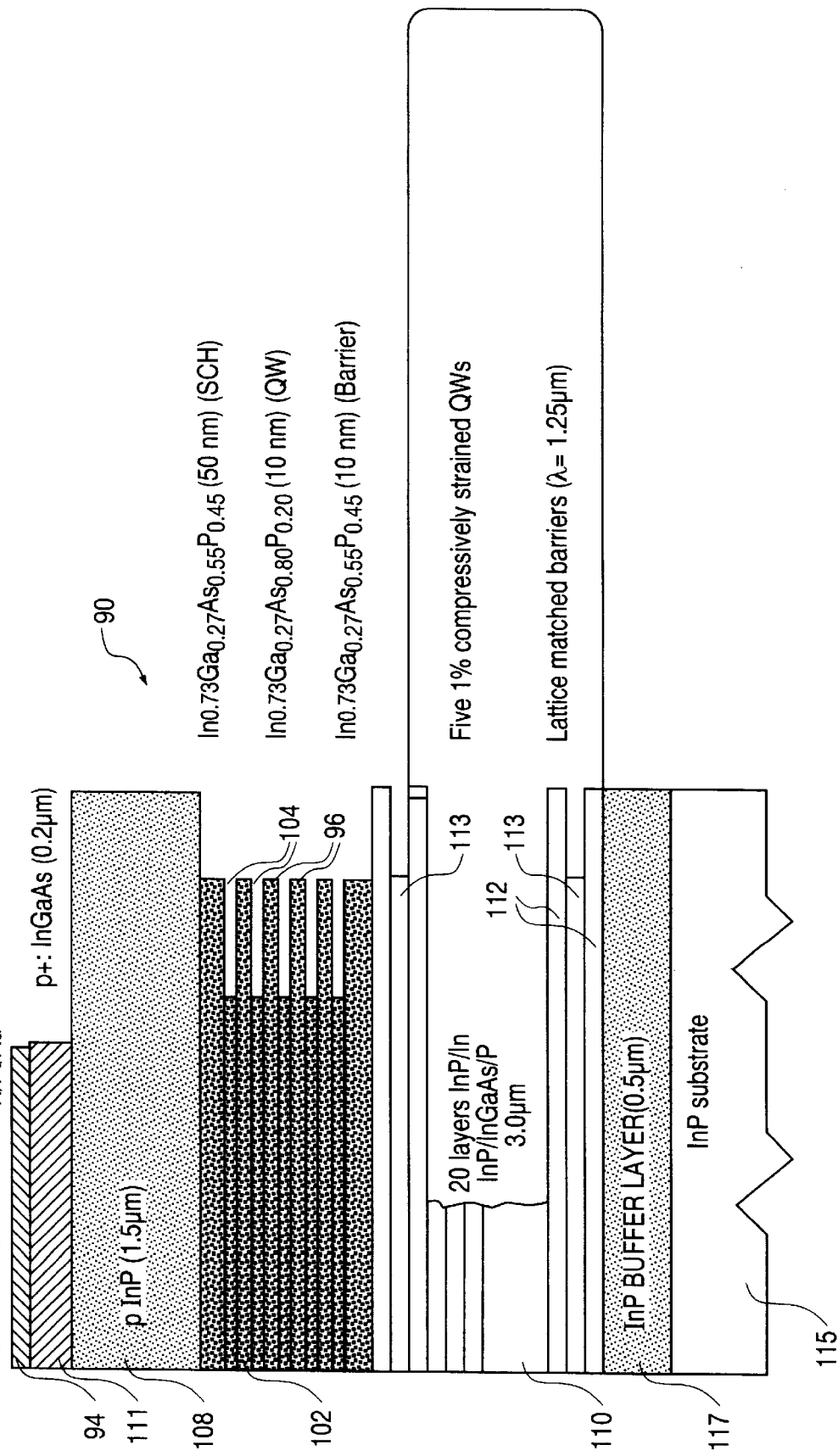
FIG. 10C is a sectional view of the waveguide shown in FIG. 10A along line 10C—10C thereof.

FIGS. 10A, 10B and 10C are respective top plan, perspective and sectional views of such a switchable device 90 according to the invention employing separate electrodes 92 and 94 on the top surface in the active region 96 and the mode transformation region 98 respectively. The device 90 shown in cross-section in FIG. 10C comprises active layer 102 formed of undoped five 1% compressively strained 10 nm thick quantum wells 104 for emmission at 1.55 μm, and four lattice matched 10 nm barriers ($\lambda_g$=1.25 μm) 96. The active layer is surrounded by a 1.5 μm InP upper cladding ($5\times10^{17}$ cm$^{-3}$ p-doped) 108 and a 3.0 μm lower cladding 110 ($5\times10^{17}$ cm$^{-3}$ n-doped). A cap layer 111 is disposed over the upper cladding 108 to establish ohmic contact with electrodes 92 and 94. The lower cladding/coupling waveguide comprises of a 20 layer stack of alternating InP (1200A) 112 and lattice matched quaternary 113 (300A), such that the equivalent refractive index was 3.21.

The waveguides are grown on InP substrate 115 with a buffer layer 117. The coupling width $W_c$ of the active region where phase matching occurs is 1.4 μm. For efficient coupling between the two waveguides. A tapered ridge 120 has an optimized shape in the form of a third order 100 μm long exponential taper 122 followed by another 100 μm linear taper 124 from initial width of $W_i$-1 of 2.0 μm to a final width $W_F$ of 1.4 μm and another linear taper from a width $W_i$-2 1.4 μm to a final width $W_i$-2 of 0.3 μm. The two electrodes 92 and 94 are defined on top of the ridges. The first electrode 92 is 630 μm long and is positioned over the straight 2.0 μm ridge. The second electrode 94 is 150 μm long and is positioned over the taper 120.

Figure 11:
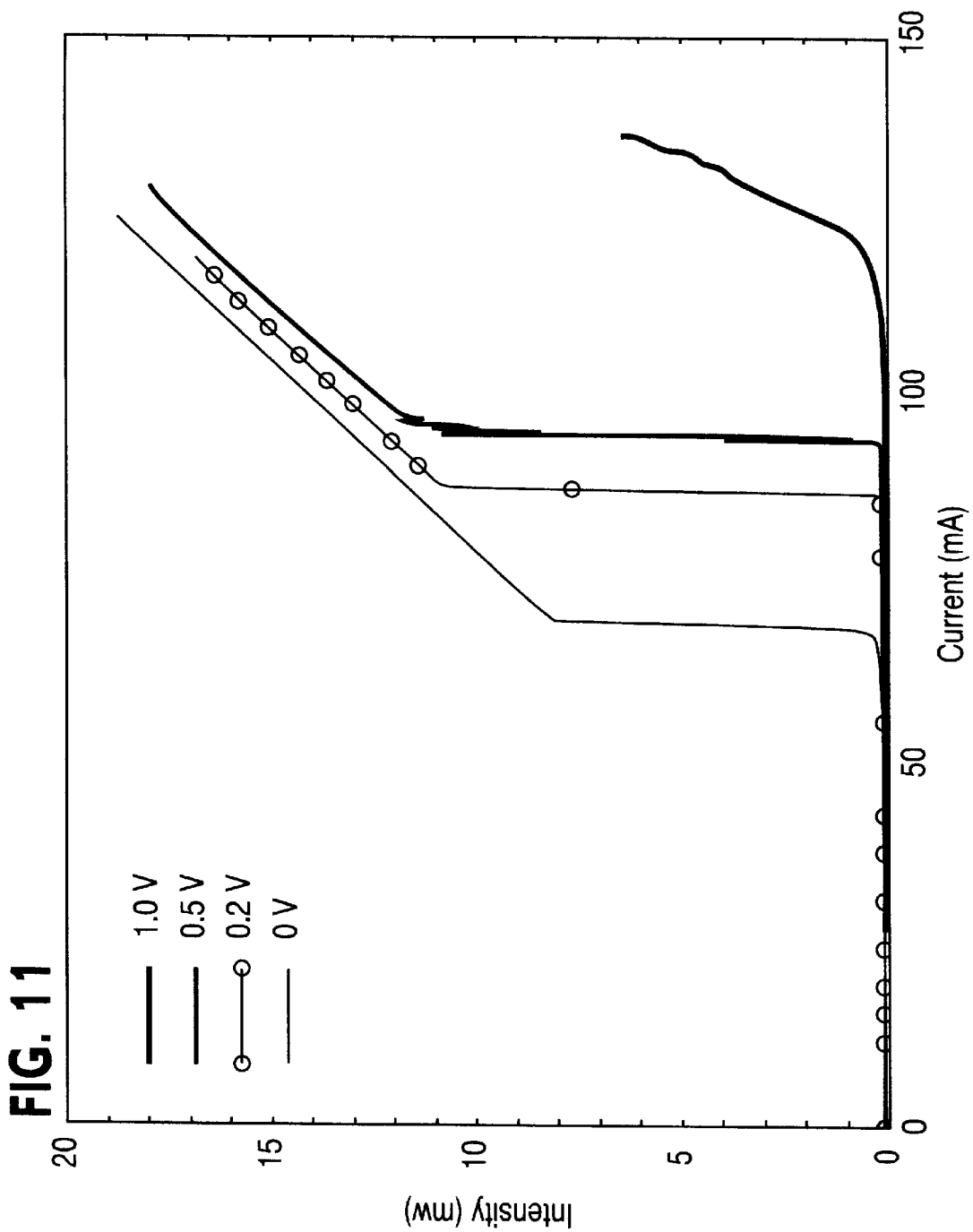
FIG. 11 is a graphical representation of light v current with bias on a device having a second electrode.

The device 90 is mounted p-side up on copper heat sinks (not shown). The first electrode 92 maybe pumped in pulsed mode and different reverse biases may be applied on the second electrode 94. The light output from the expanded facet in the passive region has characteristic LI curves for various reverse biases as shown in FIG. 11. When no bias is applied on the second electrode 94, the device 90 lases at 70 mA. The lasing threshold is increased by ~20 mA and ~30 mA for reverse biases of 0.2 V on the second electrode respectively. With bias of 1.5 V, the device does not lase. Also, good modulation depth, even with very low bias of 0.2 V around the threshold may be seen. This shows the good switching response of the device. In FIG. 11, it can be appreciated that switching voltages is reduced from about 1 V to about 0.1 V.

Farfield measurements of the device 90 using a rotating stage and a pin-hole detector were made. The transverse and lateral farfields resulted in full width half maximum (FWHM) angles 24° and 10° respectively for the transverse and lateral sides. The FWHM angles from the control facet are 39° and 34° respectively for the transverse and lateral directions. This illustrates the expansion of the mode, which would be helpful for efficient fiber coupling. A butt coupling efficiency of 3.7 dB is expected to a standard cleaved single mode fiber at 1.55 μm.

In the arrangement of FIGS. 10A–10C the device 90 uses a single region for both mode expansion and switching. The cavity length is thus not increased and hence, the device is good for high speed applications and for making hybrid fiber DBR lasers. Also, as the switching is done using reverse bias. Carriers are not involved, and hence, the associated problems of chirp in the laser are minimized.

The device may be antireflection coated on both end faces and used in a traveling wave amplifier configuration as a switch. The external modulators like electroabsorption modulators have the disadvantage of high losses and need to be integrated with amplifiers either monolithically or in a hybrid arrangement. Hybrid integration would require complex packaging technology. To have passive packaging of the devices, it may be necessary to add mode expanders on the amplifiers or modulators. Monolithic integration typically requires growth of two active regions with different bandgaps. The device has the integrated mode expander along with providing good switching contrast. It also has a gain section, which can be tailored. Thus, the device performs the function of the amplifier and the external modulator reducing the number of devices required.

Figure 12:
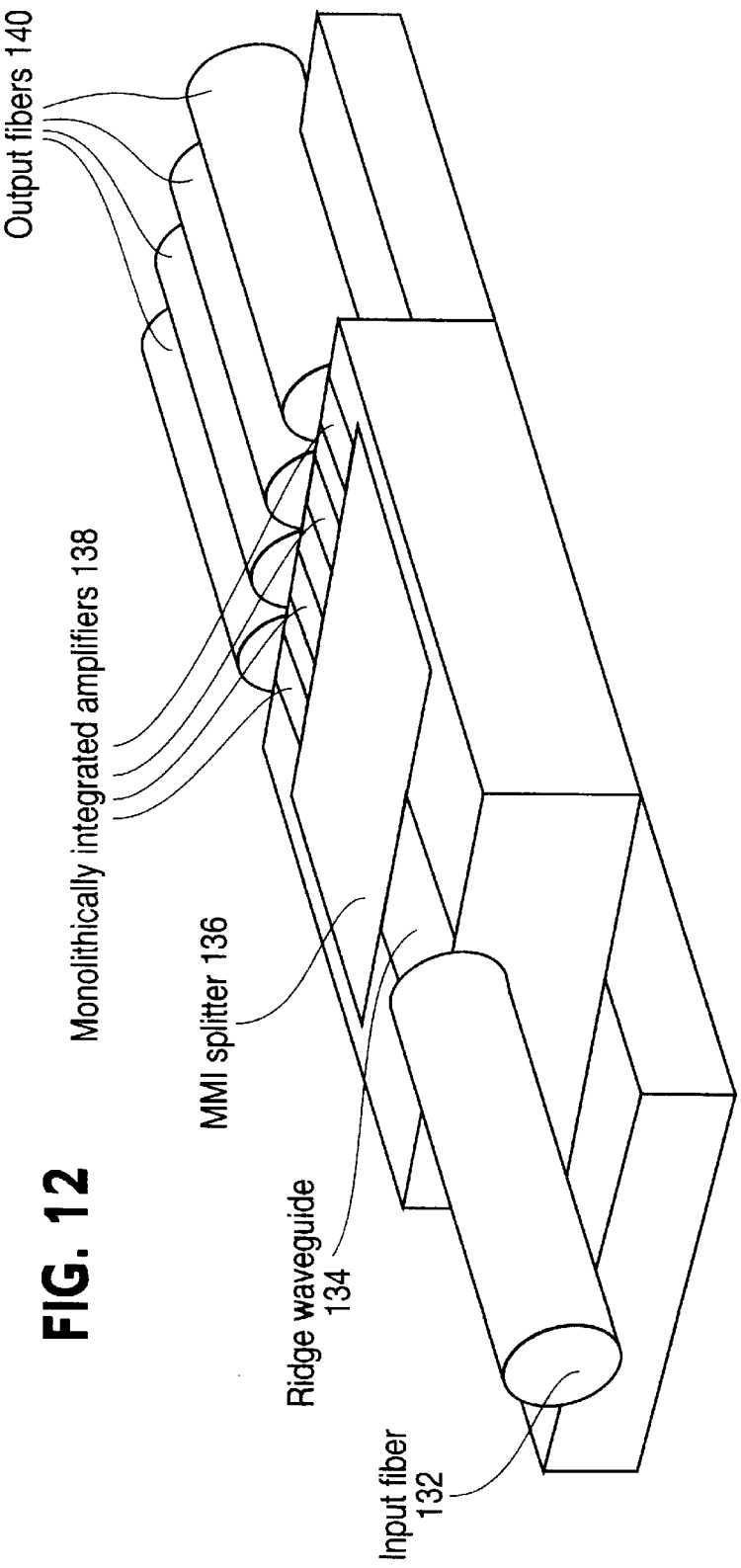
FIG. 12 is a perspective illustration of a device employing active-passive monolithic integration.

FIG. 12 shows an embodiment of the invention featuring active passive monolithic integration. The device 130 includes input fiber 132 coupled to a ridge waveguide 134 according to the invention, and a splitter 136. Monolithically integrated amplifiers 138 are integrally coupled to the splitters at one end, and are aligned with output fibers 140 as shown.

FIG. 13 shows a three stage device 140 according to the invention. In the arrangement shown, a confined active region 142 is coupled to a confined passive region 144 by a tapered ridge arrangement 146 described hereinabove. An expanded mode section 148 is coupled to the passive section 144 by tapered ridge 150.

FIGS. 14A and 14B are respective schematic plan and sectional views of an active-passive monolithic optical device 160 wherein an optical input 162 is divided or split into N channels 164-1 . . . 164-N on a passive waveguide 166. In each of the channels (e.g., channel 164-N, as shown) the optical power or mode 170 is coupled to an active region 171 of active waveguide 168 using resonant coupling to achieve an optical gain therein. In this way a 1×N lossless splitter may be implemented. The mode 170 is then coupled back to the passive waveguide 166 to achieve further optical functionality. In channel 164-N, an integrated Mach Zender 172 is implemented to achieve phase modulation. In the Mach Zender 172, the passive waveguide 166 is divided into channels 164-N1 and 164-N2 to thereby divide the optical mode 170, which is then coupled to the active region 174 in the active waveguide 168. Biasing electrodes 176 and 178 are provided on the respective arms or channels 164-N1 and 164-N2. By biasing electrodes 176 and 178 differently, a phase difference may be introduced into each arm or channel 164-N1, 164-N2 or the Mach Zender. The phase shifted modes resulting therefrom, namely 170-S1 and 170-S2, are then coupled back to the passive waveguide 166 and combined using mode combiner 180. In this way, the optical modes in the channel 164-N can be phase modulated.

FIGS. 15A–15E illustrate various types of waveguides which may be employed in various combinations in accordance with the present invention. For example, FIG. 15A shows a deep etch ridge waveguide 190A including core 192A and cladding 194 A. FIG. 15B shows a shallow edge waveguide 190B comprising core 192B, cladding 194B and residual cladding 196B. FIG. 15C shows a buried waveguide 190C having core 192C and cladding 194C all surrounding the core. FIG. 15D shows a loaded waveguide 190D having loading in the form of dielectric or metal depositions 180D which result in an effective core 192D and an effective cladding 194D. FIG. 15E shows a voltage-induced waveguide 199E with electrodes 200E and 202E which receive a bias voltage 204E resulting in a voltage-induced core 192E and a voltage-induced cladding 194E.

Figure 16:
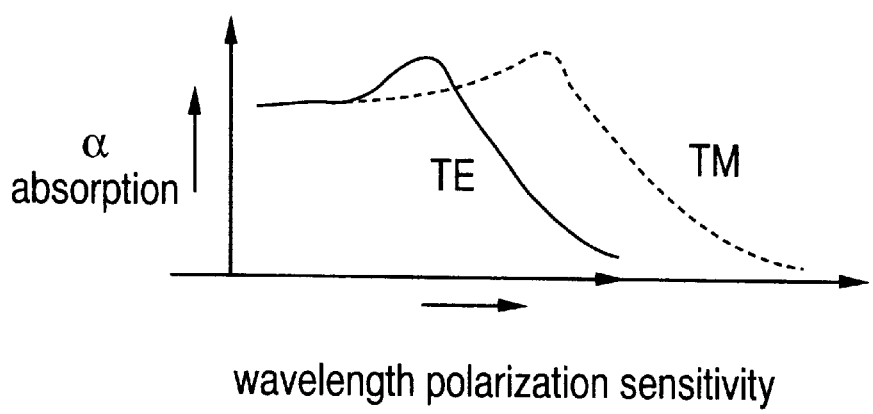
FIG. 16 shows the absorption vs. wavelength for a polarization sensitive waveguide.

FIG. 16E shows absorption vs. wavelength for TE and TM modes of a polarization sensitive waveguide. In a polarization insensitive waveguide the absorption vs. wavelength characteristics for the TE and TM modes are essentially the same.

Figure 17:
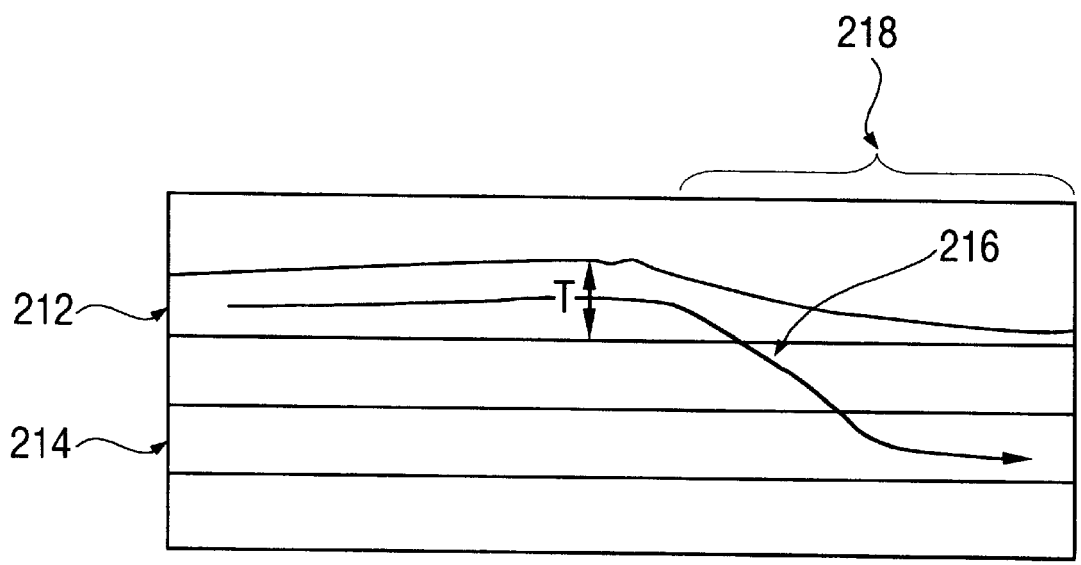
FIG. 17 shows a vertical section of a coupling region of a resonant coupler in accordance with the present invention.

FIG. 17 shows a vertical section of a coupling region 210 between an active waveguide 212 and a passive waveguide 214, wherein the thickness T of the coupling region 110 of the active waveguide 212 is tapered in the vertical direction to achieve resonance of the optical mode 216. It should be understood that the coupling region of either or both waveguides may be so tapered.

While there have been described what as present are considered to be exemplary embodiments of the invention, it will be apparent to those skilled in the art that various changes and modifications may be made therein without departing from the invention, and is it intended in the appended claims to cover such changes and modifications which fall within the spirit and score of the claims.

What is claimed is:

1. A resonant coupler for coupling modes between waveguides, comprising a coupling region having first and second ends, a coupling length, and a tapered region having variable width varying at a first selected rate, such that a phase matching condition for the waveguides is met within the coupling length of said coupling region.

2. The resonant coupler of claim 1, wherein the coupling region allows coupling from a first waveguide of the waveguides to a second waveguide of the waveguides, and wherein the first and second ends of the coupling region each have a tapered inlet having a corresponding variable width which varies at a rate greater than the first selected rate to prevent coupling back from the second waveguide to the first waveguide within the coupling region.

3. The resonant coupler of claim 1, wherein the coupling region has an electrically sensitive phase-matching condition, and further including electrode means in operative relation with the coupling region for varying of the phase-matching condition.

4. The resonant coupler of claim 1, wherein the waveguides include at least one pair of active-active, active-passive and passive-passive waveguides.

5. The resonant coupler of claim 4, wherein each waveguide has a selected index of refraction for carrying an optical mode.

6. The resonant coupler of claim 4, wherein each waveguide has a selected transverse and lateral definition.

7. The resonant coupler of claim 1, wherein the waveguides include a plurality of waveguides in active and passive combinations.

8. The resonant coupler of claim 1, wherein the tapered region includes at least one of a lateral, exponential and polynomial shape.

9. The resonant coupler of claim 1, wherein the waveguides are disposed in lateral proximity.

10. The resonant coupler of claim 1, wherein the waveguides are disposed in transverse proximity.

11. The resonant coupler of claim 1, wherein each waveguide includes a core and a cladding.

12. The resonant coupler of claim 11, wherein the cladding of one waveguide is common to the cladding of at least one other waveguide.

13. The resonant coupler of claim 1, wherein the waveguides include at least one of a ridge waveguide, a buried waveguide, a loaded waveguide and a voltage-induced waveguide.

14. The resonant coupler of claim 1, wherein the waveguide includes at least one of a polarization sensitive and polarization insensitive waveguide.

15. The resonant coupler of claim 1, wherein the taper is at least one of the lateral and transverse directions.

16. The resonant coupler of claim 1, wherein each waveguide has a tapered region in the coupling region.

17. The resonant coupler of claim 1, wherein the waveguides comprise at least one of a semiconductor, glass and a polymer.

18. The resonant coupler of claim 1, wherein the coupler is part of a laser device.

19. An optical system including the resonant coupler of claim 1, wherein the optical device is one of a semiconductor laser, loss-less splitter, electro-absorption modulator, semiconductor optical amplifier, cross-connect switch, distributed bragg grating laser, and a modulator integrated with a laser.

20. The optical system of claim 19, wherein the optical device is a semiconductor laser, one of the waveguides comprises an active gain action, and another of the waveguides comprises a passive section.

21. A resonant coupler for coupling modes between waveguides, comprising:

a coupling region having an electrically sensitive phase-matching condition, first and second ends, a coupling length. and a tapered region having a variable width varying at a first selected rate; and an electrode in operative relation with the coupling region for varying of the phase-matching condition, such that a phase matching condition for the waveguides is met within the coupling length of said coupling region when no bias voltage is applied to the electrode, and such that a phase matching condition for the waveguides is destroyed within the coupling length of said coupling region when a bias voltage is applied to the electrode.

22. A method of operating a resonant coupler for coupling modes between waveguides, the resonant coupler including a coupling region having an electrically sensitive phase-matching condition, first and second ends, a coupling length, and a tapered region having a variable width varying at a first selected rate, the method comprising:

applying a bias voltage to the resonant coupler so that a phase matching condition for the waveguides is destroyed within the coupling length of said coupling region.

23. A resonant coupler for coupling modes between waveguides, comprising:

a coupling region having an electrically sensitive phase-matching condition, first and second ends, a coupling length, and a tapered region having a variable width varying at a first selected rate; and an electrode in operative relation with the coupling region for varying of the phase-matching condition, such that a phase matching condition for the waveguides is destroyed within the coupling length of said coupling region when no bias voltage is applied to the electrode, and such that a phase matching condition for the waveguides is met within the coupling length of said coupling region when a bias voltage is applied to the electrode.

24. A method of operating a resonant coupler for coupling modes between waveguides, the resonant coupler including a coupling region having an electrically sensitive phase-matching condition, first and second ends, a coupling length, and a tapered region having a variable width varying at a first selected rate, the method comprising:

applying a bias voltage to the resonant coupler so that a phase matching condition for the waveguides is established within the coupling length of said coupling region.

* * * * *